United States Patent [19]

Hasegawa et al.

[11] Patent Number: 4,554,832
[45] Date of Patent: Nov. 26, 1985

[54] SIMULATOR OF FLUID FLOW IN FIELD OF FLOW ENTAILING COMBUSTION OR REACTION

[75] Inventors: Toshiaki Hasegawa, Saitama; Yasuo Hirose, Kanagawa, both of Japan

[73] Assignee: Nippon Furnace Kogyo Kaisha, Ltd., Tokyo, Japan

[21] Appl. No.: 550,005

[22] Filed: Nov. 9, 1983

[30] Foreign Application Priority Data

Nov. 10, 1982 [JP] Japan ................. 57-196098

[51] Int. Cl.[4] ............................................. G01F 13/00
[52] U.S. Cl. .................. 73/432 R; 358/107; 73/861.05
[58] Field of Search .......... 73/432 J, 432 R, 432 SD, 73/168, 861.05, 861.06; 358/107; 356/243; 250/574

[56] References Cited

U.S. PATENT DOCUMENTS

| | | | |
|---|---|---|---|
| 2,984,744 | 5/1961 | Lynch et al. | 73/861.05 X |
| 2,987,830 | 6/1961 | Jackson | 73/168 X |
| 3,023,623 | 3/1962 | Long et al. | 73/168 X |
| 4,031,759 | 6/1977 | Jones | 73/432 R |
| 4,238,767 | 12/1980 | Altmann et al. | 358/107 |
| 4,428,228 | 1/1984 | Banzhaf et al. | 73/168 X |
| 4,487,074 | 11/1984 | Karidis | 73/861.05 |

FOREIGN PATENT DOCUMENTS

| | | | |
|---|---|---|---|
| 636012 | 2/1962 | Canada | 358/107 |
| 2704444 | 11/1977 | Fed. Rep. of Germany | 73/432 SD |
| 697896 | 11/1979 | U.S.S.R. | 73/432 SD |
| 769091 | 10/1980 | U.S.S.R. | 73/168 |
| 826079 | 5/1981 | U.S.S.R. | 73/168 |

OTHER PUBLICATIONS

Measurement of the Ionization Losses of Particles in a Bubble Chamber using a Television Measurement Semiautomaton; Instrum. & Exp. Tech. (USA) Part 1, 8–1972; Zh. S. Takibaev et al., pp. 1025-1027.
Adaptation of the Hydraulic Tank to Flow Visualization in Turbomachines; Research Aerosp. (France); No. 1, Feb. 1972, pp. 15–21, Henri Werlé et al.
Development of Electro-Optical Instrumentation for Reactor Safety Studies; IEEE Transactions on Nuclear Science; vol. NS-28, No. 1, Feb. 1981, pp. 728–739; B. S. Turko et al.
Flow Visualization Study in Low Specific Speed Pump Impeller Passages; ICIASF '81 Record; pp. 207–212; Sep. 1981, J. H. G. Howard et al.

Primary Examiner—Stewart J. Levy
Assistant Examiner—Tom Noland
Attorney, Agent, or Firm—Gordon W. Hueschen

[57] ABSTRACT

The flow of fluid in a field of flow entailing a combustion or reaction is simulated in a model water tank by a flow of water containing a large volume of fine, uniform air bubbles made visible by projecting a slit light upon the same and then analyzing and comparing the irregular reflection obtained with standard values for the purpose of determining changes in flow, velocity of flow, and like changes, and for predicting changes.

11 Claims, 5 Drawing Figures

TIME (sec)

SIMULATOR OF FLUID FLOW IN FIELD OF FLOW ENTAILING COMBUSTION OR REACTION

Reference is made to copending application, Ser. No. 550,015, filed Nov. 8, 1983.

BACKGROUND OF THE INVENTION

Field of the Invention and Prior Art

This invention relates to a simulator for reproducing and predicting, by the use of a water flow model, the change in flow which a fluid actually shows in a field of flow entailing a combustion or reaction.

Heretofore, visualization of a flow has been performed more often than not with respect to the flow of water. The main reason for the adoption of water as the medium for visualization is that the flow speed of water necessary for retaining similarity of flow is only about 1/15 of that of air and the hydrodynamic power of water flow acting upon a given object is as much as about 800 times that of air flow. The water flow model is convenient for reproducing the flow of a fluid devoid of compressibility in a visualized state and performing qualitative observation and rough quantitative measurement as to the presence or absence of occurrence of convolution and the growth or extinction of convolution. Because of the lack of compressibility, however, it is not convenient for producing a field of flow involving change in flow due to expansion or compression of a fluid such as the field of flow entailing a combustion or reaction. Since no other suitable fluid test model has been available, it has been customary to date to infer the condition of the field of a flow entailing a combustion or reaction from the qualitative data or semi-quantitative data obtained by the use of a water flow model. The only simulator heretofore available for the observation of the field of a flow entailing a combustion or reaction has resorted to an operating principle of low order which does not admit of any change in the flow of fluid due to expansion or compression.

SUMMARY OF THE INVENTION

An object of this invention is to provide a simulator which, by the use of a water flow model, enables the change in flow actually caused by a fluid in the field of flow entailing a combustion or reaction to be reproduced and predicted.

For this invention to accomplish this object, it has been ascertained that faithful simulation of the flow of a given fluid in the field of flow entailing a combustion or reaction necessitates payment of due consideration to the expansion undergone by that fluid and that the condition of combustion of the fluid can be predicted by measuring the average concentration, change of concentration, and average velocity of the fluid as well as observing the manner of flow of the fluid and comparing the results of the measurement and observation with the data concerning the condition of mixture of a fuel with secondary air and the change in that condition as determined with a certain combustion model. Thus, the present invention provides a simulator for the flow of a fluid in the field of flow entailing a combustion or reaction, which comprises a visualizing device provided with a model water tank, a compressed water source, a conduit interconnecting the model water tank and the compressed water source, an orifice inserted in the conduit and having at least one small hole not more than 3 mm in diameter pierced therethrough such that local pressure drop of the compressed water during the passage thereof through the orifice may induce a phenomenon of deaeration resulting in release of a large volume of fine, uniform air bubbles into the flow of water and consequent reproduction within the water tank of a field of flow by the portion of water flow densely containing these fine, uniform air bubbles, and a slit light source adapted to project a slit light upon the field of flow and to visualize (i.e., to make visible) the flow of water in a given cross section of the flow by virtue of the irregular reflection of the slit light by the air bubbles.

The invention may comprise one or more further features, such as, water spurting inlet means for introducing into said tank the de-pressurized liquid containing said large volume of fine, uniform air bubbles; nozzle means for introducing non-aerated water into said tank, preferably, in which said nozzle means surrounds said water spurting inlet means and preferably an inverted cone projecting upwardly into said tank from said nozzle means.

The invention as described above further includes a device for measuring irregular reflection of light provided with a television camera for photographing the irregularly reflected beams of light produced in the aforementioned visualizing device, a monitor television for displaying the photographed images on the screen thereof, and two photosensors disposed on the aforementioned screen and adapted to measure changes in the irregularly reflected beams of light at two close points; a concentration measuring circuit adapted to compare the values of measurement obtained by the aforementioned photosensors at one of the two points of measurement with the standard values obtained from the irregularly reflected beams of light in the neighborhood of a water spurting inlet of the aforementioned water tank and determine the momentary concentration at the point of measurement; a flow velocity measuring circuit adapted to find a time interval in the changes of the irregularly reflected beams of light at the two close points detected and fed out by the aforementioned photosensors on the basis of respective interrelated functions, and find the velocity of flow with the aforementioned time interval taken as the time required for the aggregate of air bubbles in moving across the distance between the aforementioned two photosensors; and a predicting circuit adapted to predict the change in the flow of a fluid entailing a combustion or reaction along a certain combustion model on the basis of the change in concentration and the change in flow velocity obtained in the aforementioned two measuring circuits.

DESCRIPTION OF THE PREFERRED EMBODIMENTS

Now, the present invention will be described in detail below with reference to an embodiment thereof illustrated in the accompanying drawings.

The simulator of this invention is preponderantly composed of a visualizing device 30 adapted to reproduce a field of flow with a water flow containing air bubbles and visualize this field of flow by virtue of the irregular reflection of light on the air bubbles, an irregularly reflected light measuring device 31 adapted to measure changes in irregularly reflected beams of light in the field of flow, and an arithmetic circuit unit 32 adapted to find momentary concentration and flow velocity from changes in irregularly reflected beams of light and, based on the data thus obtained, predict the condition of the field of flow entailing a combustion or reaction along a certain combustion model.

Figure 1:
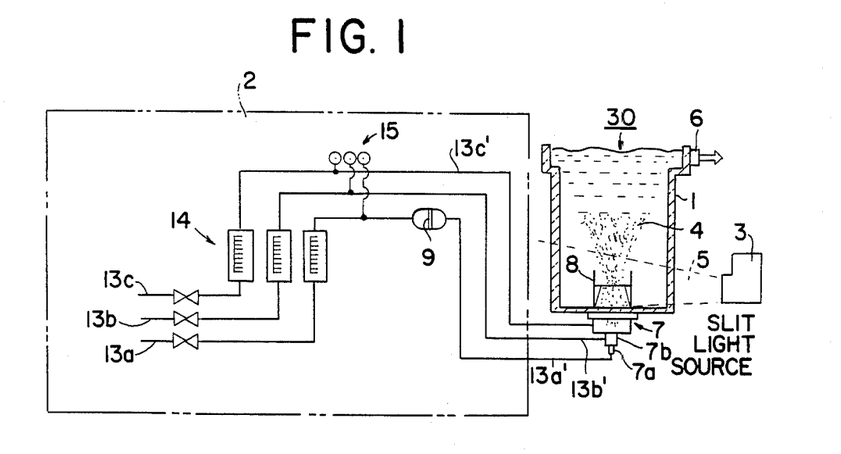
FIG. 1 is a schematic diagram illustrating a visualizing device in the simulator of this invention for the liquid flow in the field of flow entailing a combustion reaction.

The aforementioned water flow model visualizing device 30, as illustrated in FIG. 1, mainly comprises a model water tank 1 for reproducing a field of flow desired to be visualized (hereinafter referred to briefly as "water tank"), a fluid supply unit 2 for supplying a fluid such as water containing therein air bubbles 4 into the water tank via the bottom side thereof, and a slit light source 3 for projecting a slit light 5 upon the field of flow within the water tank 1. In the visualizing device, the fluid which has flowed into the water tank 1 through the bottom side thereof is utilized for reproducing a field of flow within the water tank 1 and then released through a water discharge outlet 6 at the top of the water tank 1 and discarded via a drainage pipe (not shown in the diagram). The spent water thus discharged contains no foreign particles other than air bubbles and the air bubbles, except for a small portion thereof, are dissolved again into the water. Thus, the spent water may be safely released in its unaltered state into a nearby drainage system. Optionally it may be put to reuse in its unaltered state. The fluid may be introduced downwardly into the water tank 1 from above and discharged via the bottom side. It may otherwise be introduced sideways via one lateral side of the water tank 1.

The supply unit 2 which supplies water to the aforementioned water tank 1 comprises a compressed water source which is not shown, connected through conduit or flow line 13a, orifice 9, and conduit 13a' with a fluid spurting inlet 7a of the water tank 1. The phenomenon of deareation resulting from a local pressure drop of the compressed water during the passage thereof through orifice 9 in part causes the air dissolved in the water being conveyed in a compressed state to emerge in the form of air bubbles 4 into the fluid. Thus, the fluid containing a large volume of air bubbles is supplied to water tank 1.

Supply unit 2 also supplies water which contains no air bubbles through flow line 13b to fluid spurting inlet 7b. Each of the flow lines 13 can have flow meters 14 therein as well as pressure guages 15.

If desired, a transparent cylinder 8 simulating a burner tile can be disposed in tank 1 coaxial with the inflow of water thereinto. Auxiliary air from line 13c can be jetted into the water in tank 1 as a sheath around the water jetted thereinto through spurting inlets 7a and 7b.

Figure 3:
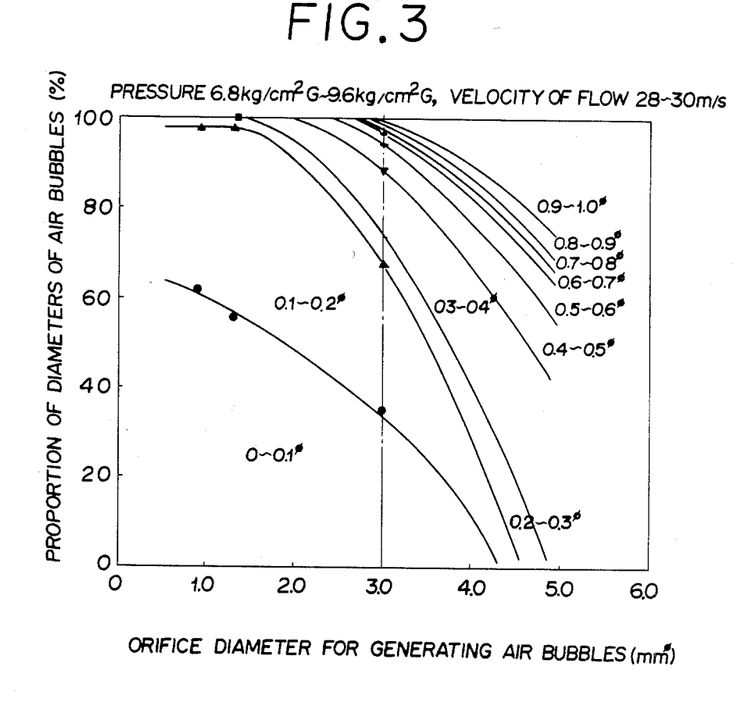
FIG. 3 is a graph showing the results of a test performed to find the relation between the orifice diameter and the proportions of diameters of air bubbles.

The orifice 9 comprises at least one small orifice or hole not more than 3 mm in diameter pierced therethrough. The diameter of the small hole in the orifice is closely related to the diameter and uniformity of the air bubbles 4 generated as described above. If the diameter of this hole exceeds 3 mm, the generated air bubbles become so non-uniform as to render accurate measurement or quantitative measurement infeasable. Generally, when the air bubbles are used as a tracer, the diameter of the air bubble optimal for the purpose of visualization is desired to fall in the range of 0.06 to 0.2 mm in due consideration of the possible error due to the poor ability of the air bubbles to follow the flow and the possible error due to the buoyancy of air bubbles. When the conditions necessary for preventing the dissolution of air bubbles 4 into the water from occurring too early is taken into account, the diameter is desired to fall in the neighborhood of 0.1 mm. According to the results of the experiment (FIG. 3) conducted by the inventors in search for the relation between the diameter of the orifice 9 and the proportions of particle diameters of the generated air bubbles 4, it is noted that when the orifice 9 has a diameter of 3 mm, air bubbles having diameters of not more than 0.2 mm which are optimal for the visualization account for about 70% of all the air bubbles generated and these air bubbles have an average-diameter of 0.113 mm and enjoy generally fair uniformity and that when the orifice 9 has a diameter of 4 mm, air bubbles having diameters of not more than 0.2 mm account for about 30% of all the air bubbles and suffer from poor uniformity. The results of the experiment indicate that the desirable diameter of the orifice is 1.5 mm or under and the most desirable diameter is between 0.8 mm and 0.5 mm. The reason for the lower limit 0.5 mm fixed for the diameter of the orifice 9 is that the orifice 9 having a smaller diameter may possibly be clogged with dirt from the fluid and prevented from stably generating air bubbles. Where a filter capable of completely removing dirt from the fluid is installed on the upstream side of the flow, the orifice may have a smaller diameter than 0.5 mm. According to the results of FIG. 3, it is noted that when the diameter of the orifice is fixed at 0.8 mm and the pressure applied to the water at 9 kg/cm$^2$, the air bubbles 4 generated have diameters in the range of 0.0781 to 0.2106 mm. This diameter distribution has been confirmed by observation of an enlarged photograph through a microscope. In this case, the air bubbles have an average diameter of about 0.1 mm, which may be called the most desirable diameter for the purpose of visualization. A desired increase in the flow volume of air bubbles may be obtained by increasing the number of small holes pierced through the orifice 9. This addition to the number of small hols concurrently serves to ensure the constancy of the content of air bubbles in the flow.

The water tank 1 in the present embodiment is formed of a material pervious to light such as, for example, acrylic resin or glass in the shape of a prism having a square cross section. It is provided in the top side with the water discharge outlet 6 and in the bottom side with the fluid inlet 7a. When the water tank 1 is intended as a water flow model such as of a nozzle or burner, for example, it functions only as a vessel for the formation of a field of flow. When it is intended for visualizing the flow of a fluid within a furnace, the water tank 1 itself is utilized as part of the model. Thus, the shape of the water tank 1 is not limited to that which is illustrated in the diagram. The water tank 1 may be in the shape of a circular tube or an elbow pipe or in any other shape adapted to suit the purpose for which the water tank 1 is used. Further, the fluid spurting inlet 7 formed on the bottom side of the water tank 1 is generally fitted with a model for reproducing a field of flow desired to be observed, such as a nozzle model or burner model, for example. There are times when such a model is installed inside the water tank 1 as separated from the fluid spurting inlet 7a so that the flow emanating from the fluid spurting inlet 7a may be left unaffected. In the case of the present embodiment, a burner nozzle model 10 and a burner tile model 11 are installed.

For the purpose of studying the condition in which a fuel and air are mixed and measuring the proportions of the two fluids, a fluid incorporating air bubbles 4 (simulating a fuel) is spurted through the spurting inlet 7a of the burner nozzle model 10 and, at the same time, a fluid incorporating no air bubbles (simulating a secondary air) is spurted through an annular spurting inlet 7b at the periphery of the burner nozzle model 10, so that the two fluids thus spurted are allowed to mix with each other inside the burner tile model 11. Of course, there is no reason at all for limiting the number of fluid spurting inlets 7 and the positions thereof to those illustrated in the diagram. The water flow model may require installation of a plurality of burners in a furnace, for example, where the effect the positions of such burners have upon the distribution of heat is desired to be studied by utilizing the water flow model. It is also sometimes desirable to jet auxiliary air into tank 1 through an annular ring of jet ports 16 connected with the air supply line 13c'.

Since the water tank 1 in the present embodiment has all the walls thereof made of a material pervious to light, the wall opposed to the human observer or the instrument for observation constitutes itself an inspection window and the side opposed to the slit light source 3 constitutes itself a window for the incident light. All the walls of the water tank 1 are not required to be made of material pervious to light. The water tank 1 fulfills its purpose amply so far as at least the sides serving as the inspection window and the window for the incident light are made of a material. The inspection window and the window for the incident light permit occurrence of irregular reflection of light under the best condition when they are positioned so as to form angles in the range of 90° to 145° relative to the direction of the incidence of the slit light 5. Thus, these windows may be installed in such positions to fulfill their parts. When the water tank 1 is formed in the shape of a circular tube, the portion of the circular wall corresponding to 90° to 145° of the entire circumference of its cross section can be made of the material pervious to light, thus ensuring fulfillment of the function of the water tank 1. When the walls of the water tank 1 other than those serving as the inspection window and the window for the incident light are made of a material capable of absorbing light, the observation of air bubbles is facilitated because the air bubbles are enabled by the irregularly reflected beams of light to become amply conspicuous without requiring the illumination within the observation room to be decreased. The light absorbing material for this purpose may be a black coating applied to the inner sides of the aforementioned walls of the water tank 1. When the condition of the field of flow is to be observed in a plane perpendicular to the direction of flow, namely in a cross section of the water tank 1, the range of 90° to 145° relative to the slit light 5 passing the field of flow transversely falls in the direction of the ceiling of the water tank 1. In this case, therefore, the human observer is required to look down into the water tank 1 from the above and the instrument for observation is required to be disposed above the water tank 1.

As the slit light source 3 for projecting the slit light 5 into the water tank 1, any of the known means available for this purpose may be adopted. For example, a plate containing a slit may be inserted into a slide projector to obtain a slit light. In this case, preparation of several plates containing a slit in a varied direction permits projection of a slit light 5 passing the flow in a desired cross section. When the slit light 5 impinges upon air bubbles 4, it is irregularly reflected. The irregularly reflected beams of light are of such nature that they will be best detected in the range of 90° to 145° relative to the direction of the incidence of the light. When the air bubbles 4 have diameters amply small and uniform, the intensity of the irregularly reflected beams of light is believed to be directly proportional to the number of air bubbles in a unit volume of flow, namely the density of air bubbles. This means that the intensity of the irregularly reflected beams of light corresponds to the concentration.

Figure 2:
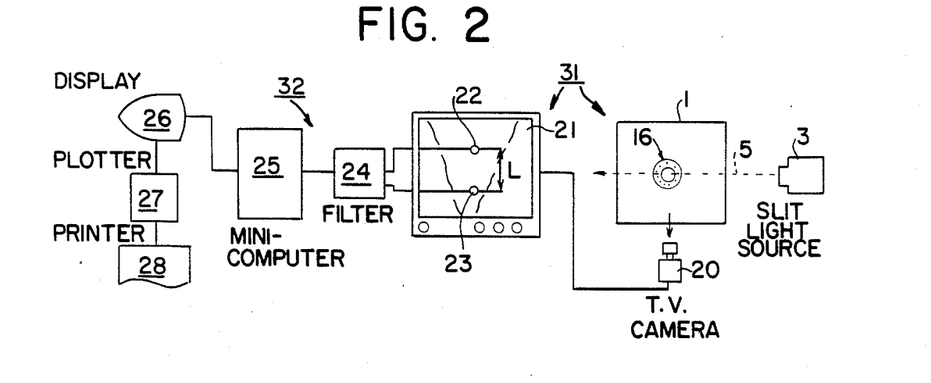
FIG. 2 is a schematic diagram illustrating a device for measuring irregularly reflected beams of light and an arithmetic circuit part in the simulator.

Further, as illustrated in FIG. 2, a TV camera 20 of the irregularly reflected light measuring device 31 is installed in front of the inspection window of the water tank 1. The irregularly reflected light measuring device 31 comprises the TV camera for photographing the field of flow inside the water tank 1 in a desired scale, a monitor television 21, and photosensors 22, 23 for measuring changes in irregularly reflected beams of light at a desired point in the field of flow displayed on the screen, e.g., braun tube, of the monitor television 21. In the device 31, there are provided two photosensors 22, 23; one of them to be operated to serve concurrently for the measurement of concentration and velocity and the other to be operated for the emission of electric signals for use in the measurement of concentration. The photosensors 22, 23 are of the type for converting optical signals into electric signals. Photosensors of other functions may be used instead.

The arithmetic circuit unit 32 comprises a filter 24 for removing scanning signals from the electric signals issuing from the photosensors 22, 23 and a mini-computer 25 incorporating therein a concentration measuring circuit for measuring momentary concentration based on changes in irregularly reflected beams of light as converted into electric signals and a velocity measuring circuit programmed so as to find the time interval in changes of concentration and changes in irregularly reflected beams of light at two close points and computing the velocity based on the time interval. In the diagram, denoted by the numeric symbols 26, 27, and 28 are a display, an XY plotter, and a printer respectively.

Since the simulator of this invention is constructed as described above, it can predict the condition of flow in the field of flow entailing a combustion or reaction when it is operated as follows.

First, as the water from the compressed water source is transferred under pressure to the water tank 1, the water on passing the orifice 9 undergoes a phenomenon of deaeration in consequence of local pressure drop and the air dissolved in advance in the water is consequently educed densely in the water in the form of fine, uniform air bubbles for optical visualization of the flow of water.

Figure 4:
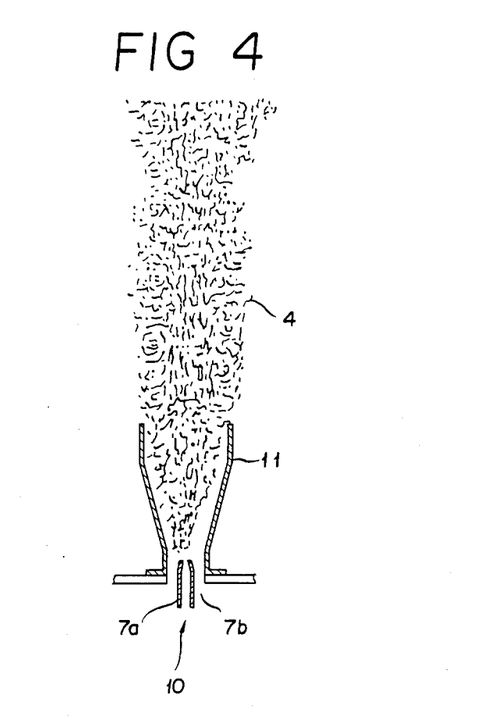
FIG. 4 is an explanatory diagram illustrating a visualized field of flow.

The portion of the water densely containing these fine, uniform air bubbles reproduces a desired field of flow within the water tank 1. Then, as the slit light 5 is projected on the field of flow, it is irregularly reflected and scattered in all directions by the air bubbles 4. Consequently, the air bubbles 4 present in the flow of water are made to appear clearly like a shower of fire sparks as illustrated in FIG. 4, to effect the desired visualization. In this case, the intensity of irregularly reflected beams of light is thought to be directly proportional to the number of air bubbles per unit volume, namely, the density of air bubbles. This means that the density of irregularly reflected beams of light is directly proportional to the concentration. Thus, the degree of density with which the air bubbles are contained in the flow of water or the concentration may be visually observed from the standpoint of the intensity of irregularly reflected beams of light.

The flow caused within the water tank 1, as illustrated in FIG. 2, is photographed with a TV camera 20 installed in front of the water tank and displayed on the screen of a monitor television 21. Then, the change in concentration or the change in irregularly reflected beams of light at a given point on the screen is measured with a photosensor 22 on the screen and is detected in the form of an electric signal such as, for example, a change in potential difference.

Although the flow of fluid may be visualized by using air bubbles 4 as a tracer, it is not possible to select one specific air bubble 4 out of an aggregate of numerous air bubbles and measure the time required for this particular air bubble to move across a prescribed distance L. In the field of flow which is produced by the portion of fluid containing fine, uniform air bubbles densely aggregated therein, however, the phenomenon of movement of an aggregate formed of air bubbles in a certain concentration appears as a change in concentration at one given point of observation. This phenomenon of the movement of the aggregate of air bubbles at some other very closely located point appears as a change in concentration having a very similar waveform. These observations have led the inventors to a knowledge that the time required by the aggregate of air bubbles in moving across the distance between two closely located points can be grasped as a time interval in the changes of concentration between the two points.

Now, therefore, the changes in concentration namely the changes in irregularly reflected beams of light at the two close points are respectively measured by means of the two photosensors 22, 23 which are installed closely to each other on the screen of the monitor television 21.

The momentary changes in concentration which have been converted into electric signals through the medium of the photosensors 22, 23 are passed through the filter 24 to be deprived of scanning signals used in the screen of the monitor television 21, and they are subsequently fed into the mini-computer 25.

In the mini-computer 25, the momentary concentration at a given point of measurement is found on the basis of the electric signals derived from either of the two photosensors. Here, the concentration of the fluid is thought to be in direct proportion to the number of air bubbles per unit volume or the density of air bubbles. Moreover, the number of air bubbles in the unit volume decreases in proportion as the proportion of the fluid containing air bubbles to the total of the two fluids in a mixed state or the concentration decreases. Thus, the concentration of the fluid can be computed based on the brightness of the irregularly reflected beams of light at the fluid spurting inlet 7 at which the portion of the fluid containing air bubbles verges on mixing with the rest of the fluid. In other words, the concentration at a given point can be found by dividing the measured voltage at that point by the standard voltage.

Figure 5:
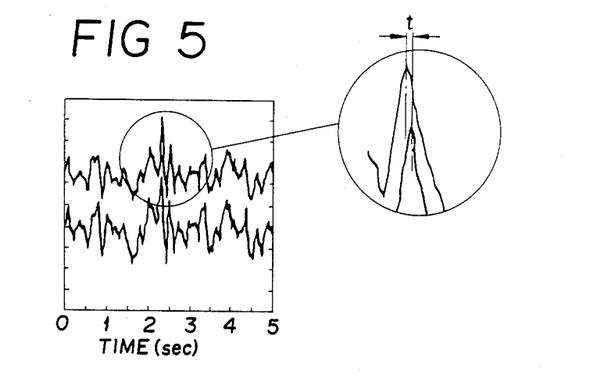
FIG. 5 is a graph showing the phases of changes in concentration measured by the photosensors in the arrangement of FIG. 2.

Further, at the mini-computer 25, the time interval and the maximum delay time in the changes of concentration occurring at the two points of measurement at the same moment are computed any suitable method known to those skilled in the art and the velocity is consequently found. As pointed out previously, similar changes in concentration occur at the two close points of measurement as illustrated in FIG. 5. Thus, the maximum delay time, $\Delta t$, is the time that elapses between the time when a characteristic concentration change occurs at one measuring point and the time that the same characteristic concentration change occurs at the other measuring point. Once the maximum delay time, namely the time, $\Delta t$, required for the aggregate of air bubbles in moving across the distance between the photosensors 22, 23 is found as described above, then the velocity is readily computed in accordance with the formula, $v = 66\ L/\Delta t$, because the distance, $\Delta L$, between the photosensors 22, 23 is always constant.

The predicted field of flow computed in the mini-computer 25 is displayed in its unaltered state as the predicted value on the screen of the display 26 and is further displayed in the form of a two- or three-dimensional graph in the XY plotter 27 and printed out in the form of numerical values in the printer 28.

The measurement of the brightness of the irregularly reflected beams of light of the screen of the monitor television 21 must be carried out by keeping the monitor ajusted so that the minimum output in the range of measurement such as, for example, about 3 mV may appear even in the darkest portion of the whole zone of measurement and the near maximum output in the range of measurement may appear in the brightest portion. The positions of measurement may be altered by moving the photosensors 22, 23 on the screen of the monitor television 21. It is of advantage, however, to adjust the position of the picture on the screen (represented by the large V) by moving the TV camera with a traverse (not shown) without moving the photosensors 22, 23, because the central portion of the screen assumes stabler and higher brightness than the peripheral portion. The measurement of the irregularly reflected beams of light is not always required to proceed simultaneously with the reproduction of the field of flow within the water tank 1. When the field of flow reproduced within the water tank 1 is photographed with the TV camera 20, the pictures of the field of flow thus photographed may be recorded on video tape. Then, the desired measurement of the velocity can be carried out at any future time by having the recorded pictures replayed on the monitor television 21. Even when the field of flow is narrow and complicated, the photography effected by the use of a zoom lens will permit relative size reduction of the photosensors 22, 23, as required, and ensure safe measurement.

As is clear from the foregoing description, the simulator of this invention enables the flow of a fluid entailing a combustion or reaction to be predicted from the water flow model different from the actual flow by causing the portion of flow of water densely containing fine, uniform air bubbles to reproduce the field of flow within the water tank, projecting the slit light upon the field of flow thereby visualizing the flow in a given cross section by virtue of the irregular reflection of the slit light on the air bubbles, photographing the irregularly reflected beams of light with the TV camera, displaying the photographed field of flow on the screen of the monitor television and, at the same time, measuring changes in the aforementioned irregularly reflected beams of light at two close points of measurement by means of the two photosensors disposed on the aforementioned screen, finding the time interval in the changes of the irregularly reflected beams of light at the two close points by means of mutual interrelation functions, finding the velocity of the flow with the time interval taken as the time required for the aggregate of air bubbles in moving across the distance between the aforementioned photosensors and, based on the similarity between the number of air bubbles in the unit volume or the concentration and the intensity of the irregularly reflected beams of light, finding the concentration by comparing the intensity of the irregularly reflected beams of light at the point of measurement with the intensity of the irregularly reflected beams of light at the water spurting inlet of the water tank, and computing the mixing ratio of the fuel with water and the change in this mixing ratio by comparing the changes in concentration and those in velocity with a certain combustion model. Further in the simulator of this invention, since the field of flow is measured by the photosensors after it has been photographed by the TV camera and displayed on the monitor television, a given position of the field of flow can be measured as enlarged in a desired scale. When the photographed field of flow is recorded in a video recorder, the measurement of the field of flow can be effected at any future time without carrying out the actual water flow test.

It is to be understood that the invention is not to be limited to the exact details of construction, operation, or exact materials or embodiments shown and described, as various modifications and equivalents will be apparent to one skilled in the art, and the invention is therefore to be limited only by the full scope of the appended claims.

We claim:

1. A simulator for the flow of a fluid in the field of flow entailing a combustion or reaction, which comprises a visualizing device provided with a model water tank, a compressed water source, a conduit interconnecting said model water tank and said compressed water source, an orifice inserted in said conduit and having at least one small hole not more than 3 mm in diameter pierced therethrough such that local pressure drop of the compressed water during the passage thereof through said orifice may induce a phenomenon of deaeration resulting in release of a large volume of fine, substantially uniform air bubbles into the flow of water and consequent production within said water tank of a simulated field of flow by the portion of water flow containing said fine, substantially uniform air bubbles, and a slit light source for projecting a slit light upon said field of flow and thereby making visible said flow of water in a given cross section of said flow by virtue of the irregular reflection of said slit light by the air bubbles.

2. A simulator of claim 1, which further comprises water spurting inlet means for introducing into said tank the de-pressurized liquid containing said large volume of fine, substantially uniform air bubbles.

3. A simulator of claim 2, which further comprises nozzle means for introducing non-aerated water into said tank.

4. A simulator of claim 3, in which said nozzle means surrounds said water spurting inlet means.

5. A simulator of claim 4, which further comprises an inverted cone projecting upwardly into said tank from said nozzle means.

6. A simulator of claim 1, which further comprises a device for measuring said irregular reflection of light, said measuring device comprising a television camera for photographing said irregularly reflected beams of said light produced in said visualizing device, a monitor television for displaying the photographed images on the screen thereof, and two photosensors disposed on said screen and connected to measurement means for sensing and thereafter measuring change in said irregularly reflected beams of light at two close points.

7. A simulator of claim 6, which further comprises means responsive to the output of at least one of said photosensors for determining the concentration of bubbles in the corresponding point in said simulated field of flow.

8. A simulator of claim 6, which further comprises means responsive to the output of said photosensors for determining the velocity of flow in said simulated field of flow.

9. A simulator of claim 1, in which the hole size in said orifice is such that under operating conditions air bubbles having an average diameter of about 0.1 mm are produced.

10. A simulator for the flow of a fluid in the field of flow entailing a combustion or reaction, which comprises a visualzing device provided with a model water tank, a compressed water source, a conduit interconnecting said model water tank and said compressed water source, an orifice inserted in said conduit and having at least one small hole not more than 3 mm in diameter pierced therethrough such that local pressure drop of the compressed water during the passage thereof through said orifice may induce a phenomenon of deaeration resulting in release of a large volume of fine, substantially uniform air bubbles into the flow of water and consequent production within said water tank of a simulated field of flow by the portion of water flow containing said fine, substantially uniform air bubbles, and a slit light source adapted to project a slit light upon said field of flow and thereby making visible said flow of water in a given cross section of said flow by virtue of the irregular reflection of said slit light by the air bubbles; a device for measuring irregular reflection of light, said measuring device comprising a television camera for photographing said irregularly reflected beams of said light produced in said visualizing device, a monitor television for displaying the photographed images on the screen thereto, and two photosensors disposed on said screen and connected to measurement means for sensing and thereafter measuring change in said irregularly reflected beams of light at two close points; a concentration measuring circuit for comparing the values of measurement obtained with said photosensors at one of said two points of measurement with standard values obtained from said irregularly reflected beams of light in the neighborhood of a water spurting inlet of said water tank and determining the momentary concentration at the point of measurement; a flow velocity measuring circuit for finding the time interval in said changes of the irregularly reflected beams of light at the two close points detected and fed out by said photosensors on the basis of respective interrelated functions, present therein, and for finding the velocity of flow with said time interval taken as the time required for the aggregate of air bubbles in moving across the distance between said two photosensors; and a predicting circuit for predicting the change in the flow of a fluid entailing a combustion or reaction along a certain combustion model preset therein on the basis of the change in concentration and the change in flow velocity obtained by said two measuring circuits.

11. A simulator of claim 10 in which the hole size in said orifice is such that under operating conditions air bubbles having an average diameter of about 0.1 mm are produced.

* * * * *

UNITED STATES PATENT AND TRADEMARK OFFICE
CERTIFICATE OF CORRECTION

PATENT NO. : 4,554,832

DATED : November 26, 1985

INVENTOR(S) : Toshiaki Hasegawa and Yasuo Hirose

It is certified that error appears in the above-identified patent and that said Letters Patent is hereby corrected as shown below:

Title Page, [56] References Cited, U.S. PATENT DOCUMENTS, line 3,; "Long et al." should read -- Lang et al. --

Title Page, [56] References Cited, OTHER PUBLICATIONS, line 10,; "B.S." should read -- B.T. --

Col. 4, line 12; "bubble" should read -- bubbles --

Col. 4, line 28; delete the hyphen "-" after "average"

Col. 4, line 56; "hols" should read -- holes --

Col. 6, line 6; delete "the" (first occurrence)

Col. 8, line 24; "v=66 L/$\Delta$t," should read -- v= $\Delta$L/$\Delta$t, --

Col. 8, line 35; ajusted" should read -- adjusted --

Col. 10, line 34; "visualzing" should read -- visualizing --

Col. 10, line 56; "thereto" should read -- thereof --

Col. 12, line 1; "preset" should read -- present --

Signed and Sealed this

Twentieth Day of May 1986

[SEAL]

Attest:

DONALD J. QUIGG

Attesting Officer

Commissioner of Patents and Trademarks